(12) United States Patent
Johnson et al.

(10) Patent No.: US 7,299,040 B1
(45) Date of Patent: Nov. 20, 2007

(54) E-BAND WIRELESS EXTENSIONS TO A REMOTE SERVICE AREA

(75) Inventors: Harold W. Johnson, Roach, MO (US); Robert J. Morrill, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 65 days.

(21) Appl. No.: 11/168,206

(22) Filed: Jun. 28, 2005

(51) Int. Cl.
*H04Q 7/20* (2006.01)
(52) U.S. Cl. .................. 455/426.2; 455/41.2; 455/11.1
(58) Field of Classification Search ................ 455/403, 455/11.1, 14, 16, 13.1, 41.2, 7, 452.2, 426.2; 398/43, 66–72, 98, 100, 165, 167.5, 140–145, 398/135, 139; 370/351, 352, 389, 395.1; 379/242, 325; 375/219, 148
See application file for complete search history.

(56) References Cited

U.S. PATENT DOCUMENTS

| | | | |
|---|---|---|---|
| 2004/0208167 A1* | 10/2004 | Kishida | 370/352 |
| 2005/0152437 A1* | 7/2005 | Baras et al. | 375/148 |
| 2005/0170789 A1* | 8/2005 | Consolazio | 455/78 |
| 2005/0265386 A1* | 12/2005 | Smith et al. | 370/466 |
| 2005/0271125 A1* | 12/2005 | Chedester et al. | 375/219 |
| 2006/0153285 A1* | 7/2006 | Modlin | 375/222 |

\* cited by examiner

*Primary Examiner*—Jean Gelin

(57) ABSTRACT

A system and method for distributing high bandwidth signals is disclosed. The system and method use an E-band wireless RF link to reach from the central service node out to a service area. The E-band wireless RF link couples to either a passive optical network (PON) or a digital subscriber line access multiplexer (DSLAM). When a DSLAM is used the signals are distributed to the end user sites using DSL across phone lines. When a PON is used the signals are distributed to the end user sites using the PON.

4 Claims, 4 Drawing Sheets

E-BAND WIRELESS EXTENSIONS TO A REMOTE SERVICE AREA

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to communication network architectures and services.

2. Description of the Prior Art

High bandwidth communication usage is increasing rapidly. In urban areas, fiber, cable, or wireless is typically linked to a central station and available. In rural areas, most users are still too far away from a central station to have high speed access. Fiber or cable may not reach out to the rural areas. With smaller demand, it may not be economical to lay fiber to these rural areas. Many rural houses are too far from a central box to be able to use DSL.

Therefore there is a need for a different architecture for distributing high bandwidth communication signals to remote areas.

SUMMARY OF THE INVENTION

A system and method for distributing high bandwidth signals is disclosed. The system and method use an E-band wireless RF link to reach from the central service node out to a service area. The E-band wireless RF link couples to either a passive optical network (PON) or a digital subscriber line access multiplexer (DSLAM). When a DSLAM is used the signals are distributed to the end user sites using DSL across phone lines. When a PON is used the signals are distributed to the end user sites using the PON and fiber cable.

DETAILED DESCRIPTION OF THE PREFERRED EMBODIMENT

FIGS. 1-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Optical fiber deployment from a telephone central office into residential subdivisions is rare. The capital cost to lay miles of fiber, as well as the disruption to auto traffic may not be justified by the initial network traffic level across the newly laid links. In one example embodiment of the invention, E-band wireless RF links are used to connect the subdivision, or targeted service area, to the central office or a central service node. In some cases an optical fiber link may extend from the central office or central service node, part way to the residential area or targeted service area. In these cases the E-band wireless RF links would be used to extend the optical fiber link out to the targeted service area. E-band wireless RF links typically operate at frequencies around 70-90 GHz allowing a capacity of approximately 1.5 Gbps, with future capacity up to approximately 10 Gbps per path link. E-band wireless links require a clear line of sight without foliage or obstructions of any kind. With the clear line of sight requirement, deploying the E-band links along the tops of existing electrical transmission line poles is one easy way to implement the deployment of the links. Each E-band link can typically travel between 1-2 miles, depending on the rain zone to achieve adequate all weather reliability. Multiple E-band links can be chained together to extend out to remote service areas, for example 20-40 miles or more.

Once the E-band link extends from the central service node out to the targeted service area the signals are distributed to the end user sites using a different technology. In one example embodiment of the invention, a digital subscriber line access multiplexer (DSLAM) is placed at the end of the E-band links. The DSLAM is coupled to phone lines and uses DSL across the phone lines to connect to the end user sites. Any type of DSL may be used including asymmetric digital subscriber line (ADSL), asymmetric digital subscriber line 2 plus (ADSL2 plus), very-high-data-rate digital subscriber line (VDSL), or the like. In another example embodiment of the invention, a passive optical network is used to distribute the signals from the E-band links out to the individual end user sites.

Figure 1:
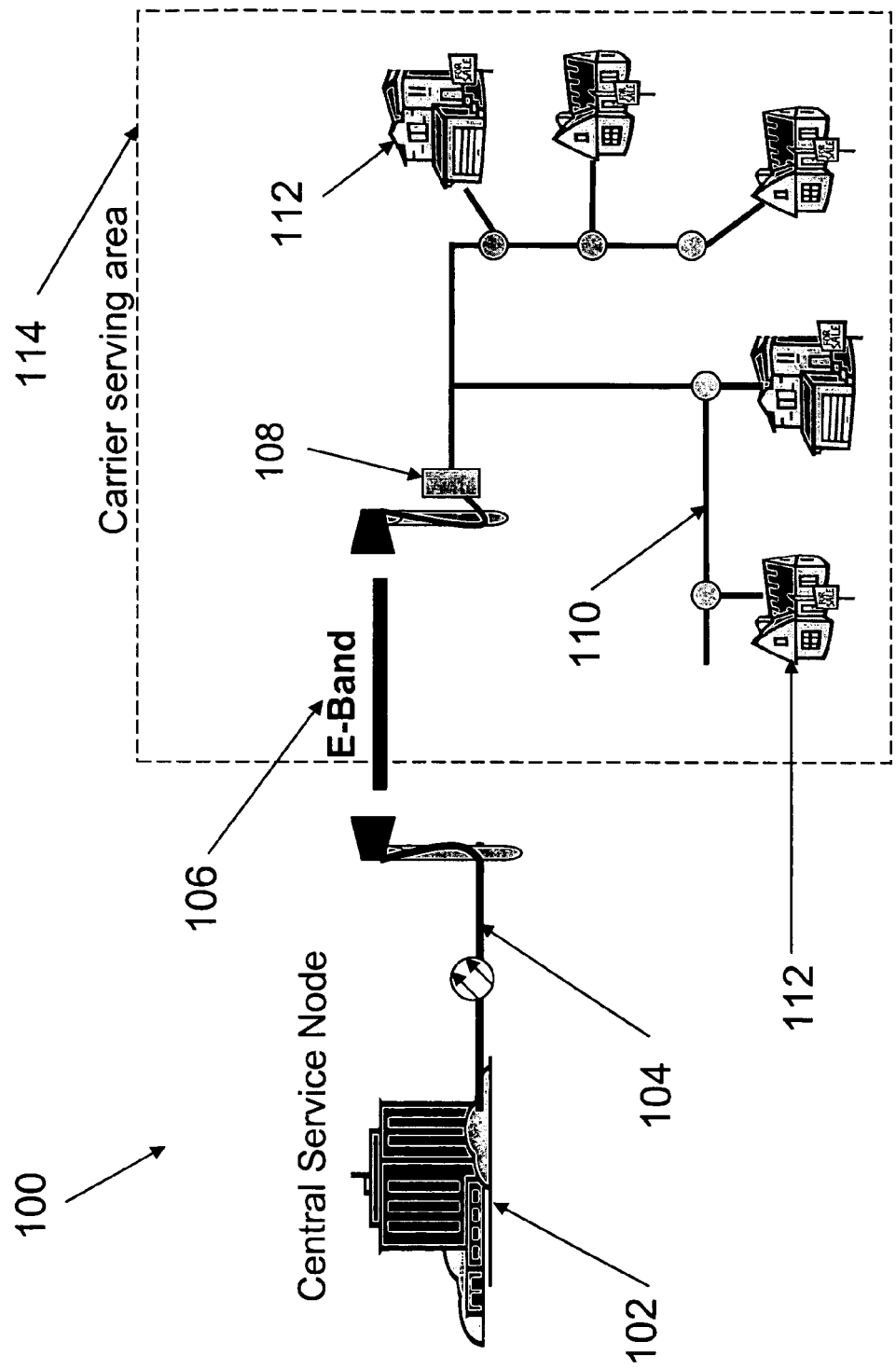
FIG. 1 is a block diagram of a communication network 100 in one example embodiment of the current invention.

FIG. 1 is a block diagram of communication network 100 in one example embodiment of the current invention. Communication network 100 comprises a central service node 102, an optical fiber link 104, an E-band wireless RF link 106, a digital subscriber line access multiplexer (DSLAM) 108, a twisted pair network 110, and a plurality of end user sites 112 inside a service area 114. In one example embodiment of the invention, central service node 102 may only have a single switch and have basic capabilities, for example high speed voice or data communications. In another example embodiment of the invention, central service node 102 may have more advanced capabilities and comprise multiple switching exchanges, computer systems with mass storage, and the like. The more advanced central service node may provide a plurality of signals, for example voice, data, video, IP video programming, and the like. These signals are sent from central service node 102 across optical fiber link 104 to the E-band wireless RF link 106. The plurality of signals are sent across the E-band wireless RF link 106 to the DSLAM 108. The plurality of signals are distributed from the DSLAM 108 to the plurality of user sites 112 across the twisted pair network 110. E-band wireless RF link 106 may be made up of one or more E-band links, where each E-band link spans up to 3 miles. The E-band links may be deployed along the poles of an existing electrical distribution system (not shown) or may be installed on new utility poles dedicated to the E-band link. In one example embodiment of the invention, the end user sites are residences. In another example embodiment of the invention, the E-band link 106 may connect directly to the central service node 102.

In one example embodiment of the invention, some of the end user sites 112 may have satellite receivers (not shown). The end user sites that do have satellite receivers may receive some programming via satellite and other programming over the E-band wireless RF link.

Figure 2:
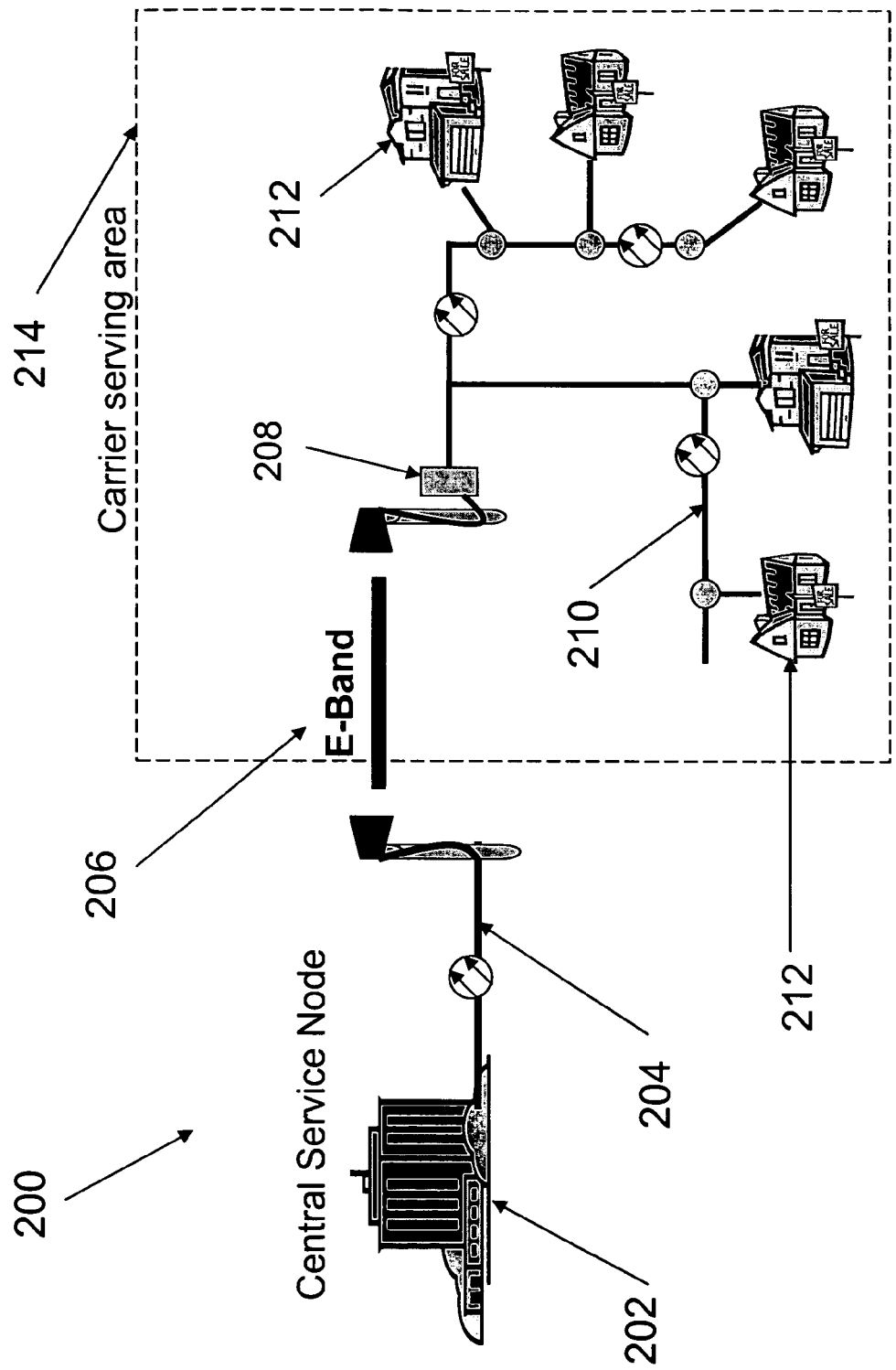
FIG. 2 is a block diagram of a communication network 200 in one example embodiment of the current invention.

FIG. 2 is a block diagram of a communication network 200 in one example embodiment of the current invention. Communication network 200 comprises a central service node 202, an optical fiber link 204, an E-band wireless RF link 206, a passive optical network (PON) system cabinet 208, a passive optical network 210, and a plurality of end user sites 212 inside a service area 214. In operation, a plurality of signals, for example voice, data, video, and the like, are sent from central service node 202 across optical fiber link 204 to the E-band wireless RF link 206. The plurality of signals are sent across the E-band wireless RF link 206 to the passive optical network (PON) system cabinet 208. The plurality of signals are distributed from the PON system cabinet 208 to the plurality of user sites 212 across PON 210. PON 210 may be an Ethernet passive optical network (EPON). E-band wireless RF link 206 may be made up of one or more E-band links, where each E-band link spans 1 to 3 miles. The E-band links may be deployed along the poles of an existing electrical distribution system (not shown) or may be installed on new utility poles dedicated to the E-band link. In one example embodiment of the invention, the end user sites are residences. In another example embodiment of the invention, the E-band link 206 may connect directly to the central service node 202.

Figure 3:
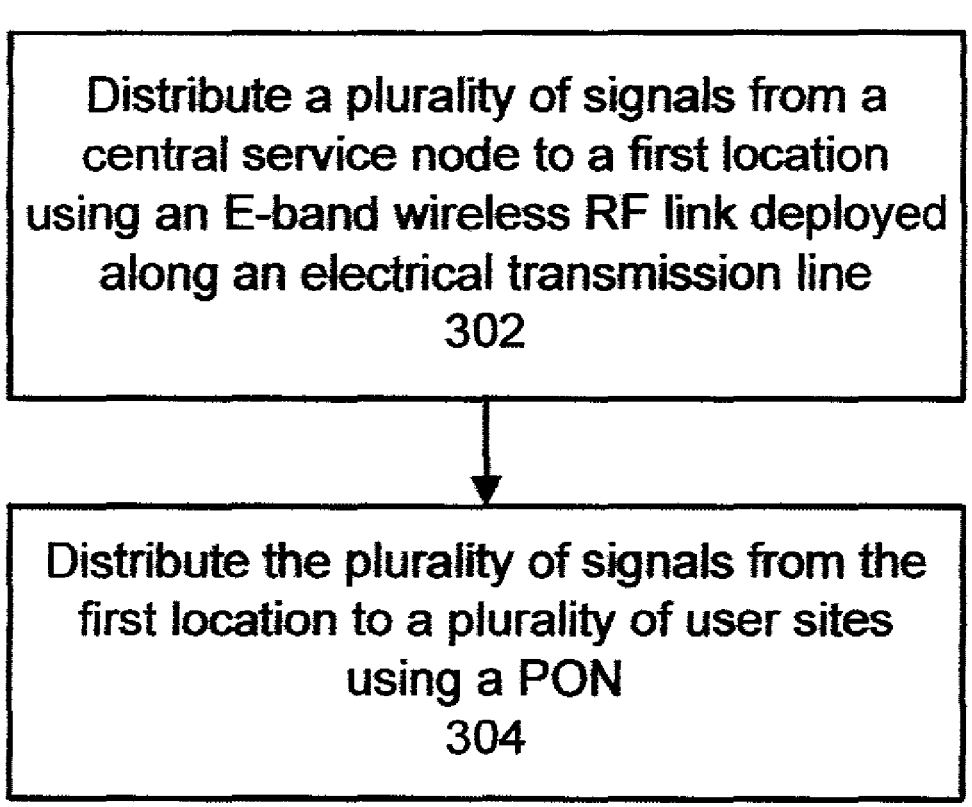
FIG. 3 is a flow chart for a method of distributing a plurality of signals to a plurality of end users sites in an example embodiment of the invention.

FIG. 3 is a flow chart for a method of distributing a plurality of signals to a plurality of end user sites in an example embodiment of the invention. At step 302 a plurality of signals are distributed from a central service node to a first location using an E-band wireless RF link deployed along an electrical power transmission line. At step 304 the plurality of signals are distributed from the first located to a plurality of user sites across a passive optical network.

In some cases the initial traffic level may not justify installing a passive optical network to distribute the signals to the end user sites. In these cases phone lines may be used to distribute the signals from the E-band links until the traffic level reaches a level that justifies adding the PON.

Figure 4:
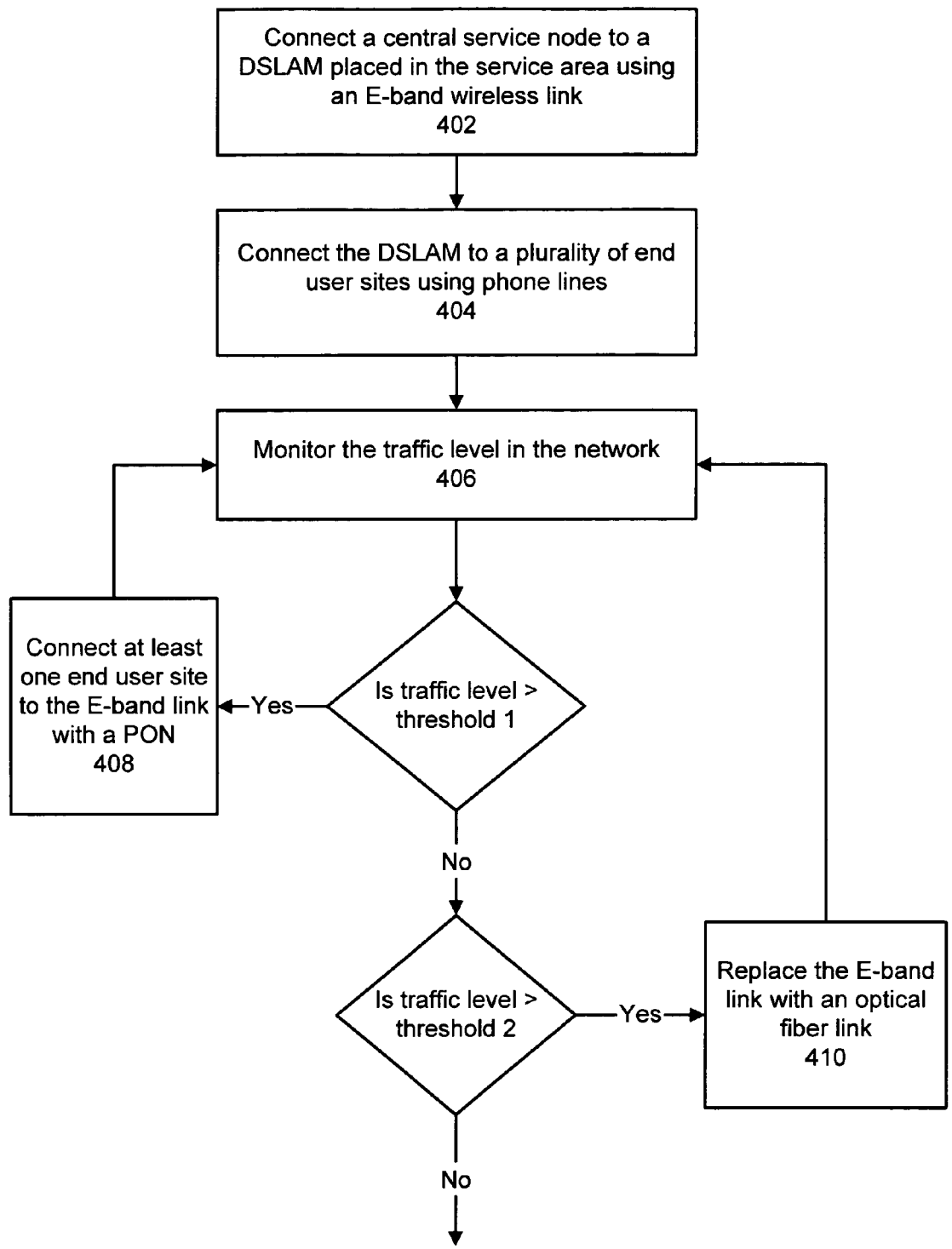
FIG. 4 is a flow chart for a method of deploying a high speed communication network to a remote service area.

FIG. 4 is a flow chart for a method of deploying a high speed communication network to a remote service area. At step 402 a central service node is connected to a digital subscriber line access multiplexer (DSLAM) placed in the remote service area using one or more E-band wireless RF links. If the central service node is linked to an optical fiber that extends part way to the remote service area, the E-band wireless RF links may couple to the optical fiber. The E-band links may be placed on the utility poles of an existing electrical transmission line or may be installed on new utility poles dedicated to the E-band links. At step 404 the DSLAM is connected to one or more end user sites in the service area using phone lines. The DSLAM may use a DSL link across the phone lines. Any type of DSL may be used including asymmetric digital subscriber line (ADSL), asymmetric digital subscriber line 2 plus (ADSL2 plus), very-high-data-rate digital subscriber line (VDSL), or the like. The traffic flowing through the network is monitored in step 406. The traffic may be monitored at each user site, through the DSLAM, through the entire network, or the like. When the traffic level reaches a first threshold, at step 408 a passive optical network system cabinet is added to the system and a passive optical network (PON) is run to at least one of the end user sites. The PON may be used to replace all or just some of the links to the end user site. The decision to replace an existing DSL link with the PON may be dependent on the traffic level from the user site, the cost of running the optical fiber, the length of the link, or the like. At step 410, when the traffic through the network reaches a second threshold the E-band wireless RF link is replaced with an optical fiber. The first and second threshold may be the same traffic level or different traffic levels. When the first and second thresholds are the same level, the E-band links would be replaced at the same time that the PON is added to the system.

In one example embodiment of the invention, a PON would be used at step 404 instead of a DSLAM. A PON may be used initially due to a higher traffic level, where the end user sites are distributed across a larger geographic area, or the like.

We claim:

1. A method comprising:
   forming a communications network by connecting a central service node to a passive optical network (PON) using at least one E-band wireless link;
   connecting the PON to a plurality of end user sites;
   monitoring a traffic level in the network;
   replacing the at least one E-band wireless link with an optical fiber link when the traffic level reaches a threshold.

2. The method of claim 1 where the PON is an Ethernet passive optical network (EPON).

3. A method comprising:
   forming a communications network by connecting a central service node to a digital subscriber line access multiplexer (DSLAM) using an E-band wireless link;
   connecting the DSLAM to a plurality of residences using DSL across a plurality of existing phone lines;
   monitoring a traffic level in the network;
   when the traffic level reaches a first threshold connecting at least one of the plurality of residences to the E-band wireless link using a passive optical network (PON);
   replacing the E-band wireless link with an optical fiber link when the traffic level reaches a second threshold.

4. The method of claim 3 where the DSL type is selected from the group of:
   asymmetric digital subscriber line (ADSL), asymmetric digital subscriber line 2 plus (ADSL2 plus), or very-high-data-rate digital subscriber line (VDSL).

* * * * *